United States Patent [19]

Johnson, Jr.

[11] 4,297,115
[45] Oct. 27, 1981

[54] BAG-TYPE FILTER WITH AIR DIFFUSER TUBES OF HELICAL CONSTRUCTION

[75] Inventor: Allen S. Johnson, Jr., Salisbury, N.C.

[73] Assignee: Staclean Diffuser Company, Salisbury, N.C.

[21] Appl. No.: 178,847

[22] Filed: Aug. 18, 1980

Related U.S. Application Data

[63] Continuation-in-part of Ser. No. 76,605, Sep. 18, 1979, Pat. No. 4,231,770.

[51] Int. Cl.³ .............................................. B01D 46/04
[52] U.S. Cl. ................................. 55/302; 55/341 R; 55/379
[58] Field of Search ...................... 55/302, 341 R, 379

[56] References Cited

U.S. PATENT DOCUMENTS

| | | | |
|---|---|---|---|
| 2,828,017 | 3/1958 | Ronningen et al. | 55/303 X |
| 3,538,687 | 11/1970 | Pausch | 55/379 |
| 3,594,992 | 7/1971 | Carr et al. | 55/302 |
| 3,680,285 | 8/1972 | Wellan et al. | 55/379 X |
| 4,097,255 | 6/1978 | Samolis | 55/302 X |
| 4,231,770 | 11/1980 | Johnson, Jr. | 55/302 |

FOREIGN PATENT DOCUMENTS

| | | | |
|---|---|---|---|
| 453176 | 1/1975 | U.S.S.R. | 55/302 |
| 443674 | 4/1975 | U.S.S.R. | 55/302 |

*Primary Examiner*—Kathleen J. Prunner
*Attorney, Agent, or Firm*—Bell, Seltzer, Park & Gibson

[57] ABSTRACT

A bag-type filter apparatus, whose elongate tubular filter bags are supported by tubular cages therewithin, is provided with an air diffuser tube extending longitudinally within each tubular cage for diffusing and distributing a periodic reverse purge air flow throughout each filter bag to dislodge from the exterior surface of each filter bag particulate material which normally collects on the filter bags. Each air diffuser tube is formed from a perforate strip of helically wound sheet metal, adjacent edges of which are interconnected by a seam in which such adjacent edges overlap each other in interlocking relationship so that the seam extends helically around the respective air diffuser tube.

10 Claims, 6 Drawing Figures

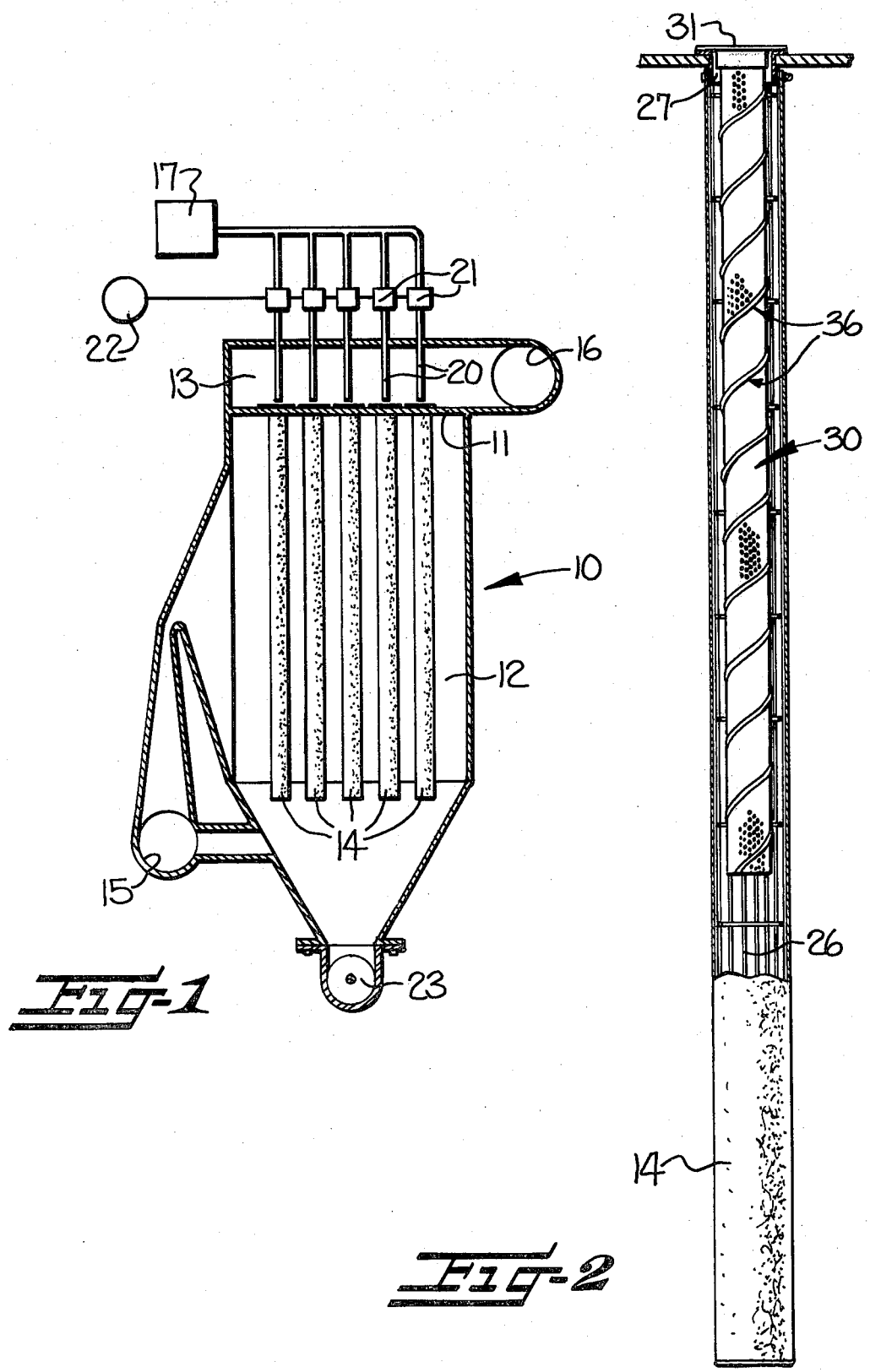

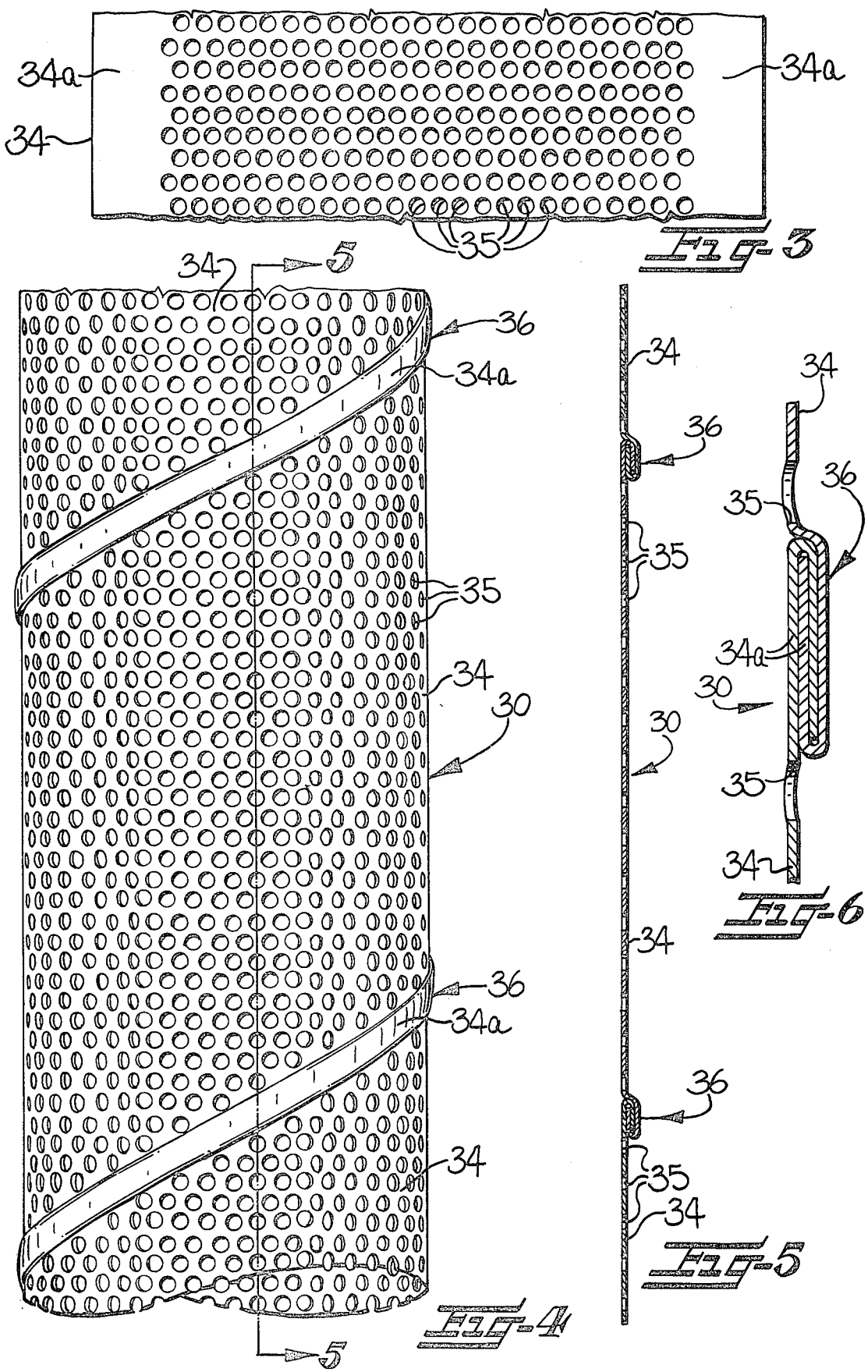

BAG-TYPE FILTER WITH AIR DIFFUSER TUBES OF HELICAL CONSTRUCTION

CROSS-REFERENCE TO RELATED APPLICATION

This application is a continuation-in-part of copending application Ser. No. 06/076,605, now U.S. Pat. No. 4,231,770, filed Sept. 18, 1979, and entitled BAG-TYPE FILTER APPARATUS WITH INTERNAL AIR DIFFUSER.

BACKGROUND AND SUMMARY OF THE INVENTION

This invention relates to filter apparatuses of the type having elongate tubular filter bags for removing particulate material from a moving air or gas stream. More particularly, the invention is concerned with an improved air diffuser construction positioned in an elongate supporting cage which supports a surrounding tubular filter bag thereon.

In the aforementioned copending application there is disclosed a technique for cleaning gas permeable filter bags which normally collect dust, soot and other particulate material on the exterior surfaces thereof as the filtered air is exhausted through the open outlet ends of the filter bags, and wherein in addition to the usual tubular supporting cage within each tubular filter bag, a hollow, perforated, air diffuser tube is provided which extends longitudinally within each cage and the respective filter bag and communicates with the outlet end of the bag so that, when a periodic reverse purge flow of air is directed into the outlet end of the filter bag, the air is diffused by the diffuser tube and more uniformly distributed throughout the filter bag. Such more uniform distribution of the reverse purge air flow results in highly effective cleaning of the filter bag while also reducing excessive flexing of the filter bag and reducing abrasive wear thereof, thereby increasing the efficiency of the filter apparatus and significantly increasing the life of the filter bag.

In the early development of the air diffuser of said copending application, perforated air diffuser tubes of convolute form were used, i.e., they were made from a perforated metal sheet whose opposite longitudinal edges were overlapped and interconnected, as by welding and/or riveting to form a seam extending along the length of and parallel to the axis of the diffuser tube. While convolute air diffuser tubes have performed quite well for diffusing and distributing the reverse purge flow of air throughout the respective filter bags during the cleaning operations, it has been found that since the longitudinal seam of each of such convolute air diffuser tubes is imperforate, the seam tends to "blank out" or inhibit the flow of the reverse purge of air outwardly along an adjacent narrow area of the length of the respective tubular filter bag. Also, since it is desirable that the diffuser tube is provided throughout with relatively small, closely spaced perforations, it has been necessary to construct such convolute diffuser tubes of relatively heavy gauge sheet metal so that they would not bend easily or become damaged otherwise in the normal handling of the same during their manufacture, storage, and installation.

Accordingly, it is an object of this invention to provide a filter apparatus of the type described with air diffuser tubes of improved rigidity and stability and which substantially eliminates the "blank-out" problem presented by the longitudinal seams of the convolute air diffuser tubes used heretofore.

It is another object of this invention to provide an air diffuser tube of such construction that it may be made from a relatively lighter weight sheet metal as compared to the sheet metal used heretofore, and additionally has improved rigidity and stability for more effectively retaining its shape and integrity during normal handling and use and furthermore presents a more economically manufactured product.

According to the invention, filter apparatus of the type described is provided with a hollow air diffuser tube formed from a perforated strip of helically wound sheet metal and extending longitudinally within each filter bag supporting cage of the filter apparatus, and adjacent edges of the helically wound strip are interconnected by a seam in which the adjacent edges of the strip overlap each other in interlocking relationship. Thus, the seam extends helically around the air diffuser tube and provides a thickened area to impart rigidity and strength to the air diffuser tube permitting the use of a relatively thin gauge sheet metal in the manufacture of the air diffuser tube.

BRIEF DESCRIPTION OF THE DRAWINGS

Some of the objects of the invention having been stated, other objects will appear as the description proceeds when taken in connection with the accompanying drawings in which FIG. 1 is a schematic vertical sectional view through a filter apparatus of the type employing a plurality of bag-type tubular filters;

FIG. 2 is a side elevation of a bag-type filter assembly, partially in section, and illustrating the filter bag, its supporting cage, and the hollow diffuser tube of the present invention;

FIG. 3 is a fragmentary elevation of a portion of a perforated strip of sheet metal employed in forming the improved hollow air diffuser tube of the present invention;

FIG. 4 is an enlarged fragmentary elevational view of a medial portion of the air diffuser tube shown in FIG. 2;

FIG. 5 is a fragmentary longitudinal sectional view through the wall of the air diffuser tube taken substantially along line 5—5 in FIG. 4; and FIG. 6 is an enlarged fragmentary view of a preferred form of the seam interconnecting adjacent edges of the perforated strip of helically wound sheet metal forming the improved air diffuser tube.

DETAILED DESCRIPTION

Referring more specifically to the drawings, there is shown in FIG. 1 a conventional filter apparatus of the type utilizing elongate bag-like tubular filters, which filter apparatus includes a filer housing 10, generally known as "baghouse," which is divided by a substantially horizontal wall 11 into a lower filtering chamber 12 and an upper filtered air chamber or plenum 13. A plurality of elongate, hollow, tubular filter bags 14 are mounted in the filtering chamber 12 in a generally vertical orientation with the upper ends thereof supportingly carried by the horizontal dividing wall 11. The upper ends of the respective filter bags 14 communicate with the filtered air plenum 13 via holes provided in wall 11.

As shown, particulate-laden gas is directed into the filtering chamber 12 through an air inlet duct 15, where it passes around the respective filter bags 14 and then flows through the gas permeable filter bags while the particulate material is filtered and retained on the exterior surface of the filter bags. After passing into the hollow interior of the filter bags 14, the filtered gas passes upwardly through the outlet ends of the respective bags and into the filtered air chamber 13. The thus-filtered gas in directed from the filtered air chamber 13 outwardly through an outlet duct 16.

As the particulate material accumulates on the exterior surfaces of the filter bags 14, it becomes necessary to clean the filter bags by dislodging the accumulated particulate material therefrom. This is accomplished by periodically directing a purging reverse flow of air through the filter bags 14. As disclosed in said copending application, the reverse purge flow of air may be effected simply by periodically directing compressed air into the filtered air plenum 13 while blocking the flow of air from the plenum into the outlet duct 16 so that the compressed air is directed in a reverse direction into the outlet ends of the respective filter bags 14. In the illustrated filtering apparatus, purge air from a compressed air source 17 is directed, in the form of individual jets of air, into the open upper ends of the filter bags 14 via respective nozzles 20 connected to the source of compressed air 17 by control valves 21. The control valves 21 are normally closed and are periodically momentarily opened by a suitable control means 22. The particulate material dislodged from the filter bags 14 may be accumulated in the lower portion of the filter housing 10 and removed by any suitable means such as a screw conveyor 23.

FIG. 2 illustrates the various components of a filter assembly. As illustrated, each elongate tubular filter bag 14 is made of a gas permeable fabric and in a form somewhat similar to a sock, having one open end and one closed end. The filter assembly also includes an elongate tubular supporting frame 26, commonly termed a "cage." The supporting frame of cage 26 is of openwork construction for readily allowing the flow of air therethrough, and is typically formed of heavy wire. The cage 26 has an outwardly extending rim or flange 27 at its upper portion for securing the cage to the substantially horizontal wall 11 of the filter housing, and the lower end of the cage 26 may be closed by an end plate, not shown. As is further disclosed in said copending application, the cage 26 is adapted to be positioned inside the respective tubular filter bag 14 so as to hold the filter bag in an open tubular configuration and prevent it from collapsing upon itself during the filtering operation as the particulate-laden gas passes inwardly therethrough To aid in effectively cleaning each filter bag, an improved hollow, perforated air diffuser tube 30 is provided within each tubular cage 26. The air diffuser tube 30 of the present invention serves the same purpose as the air diffuser tube of said copending application, but the tube of the present invention is of improved construction to lend rigidity and stability thereto and to substantially eliminate the "blank-out" problem presented by the longitudinal seams of the convolute air diffuser tubes used heretofore.

As illustrated, the air diffuser tube 30 is of a size adapted for being readily received longitudinally within the hollow cage 26. The diffuser tube 30 preferably is provided with an out-turned lip or flange 31 on its upper end to assist in mounting the diffuser tube in place within the tubular supporting cage 26. Preferably, the diameter of the diffuser tube 30 is as large as possible for maximizing the cross-sectional area of the diffuser while still allowing sufficient clearance between the diffuser tube and the cage 26 to permit inserting the same into position within the cage 26 and so that the diffuser tube will be substantially out of contact with the surrounding cage 26 and the filter bag 14. For example, in a typical filter assembly according to this invention, an air diffuser tube 30 having an outside diameter of about three and one-half inches was used with a filter bag 14 about four inches in diameter.

As shown in FIG. 2, the air diffuser tube 30 is of a length somewhat less than the overall length of the supporting cage 26 with the lower end as well as the upper end of the diffuser tube 30 being open. Most desirably, the diffuser tube 30 should have length about two-thirds to three-fourths the overall length of the cage 26. However, it has been determined that lengths considerably less than these preferred lengths still provide very beneficial results as compared to the results obtained in accordance with prior art arrangements wherein no diffuser tube was employed.

As set forth in said copending application, it has been determined that one of the primary reasons for the ineffective cleaning of the conventional filter bag arrangement is that the pulse or blast or reverse purge air was concentrated in the area adjacent where it entered the interior of the filter, namely, adjacent the outlet end of the filter. The effect of the reverse purge was substantially dissipated at the far end of the filter from the air outlet. Thus, while the outlet end of the filter was being acted upon by the reverse purge of air, and in fact may have actually been overcleaned, the far end of the filter was essentially left uncleaned. As a result, the entire length of the filter bag was not being effectively utilized for filtration and the efficiency of the filter was diminished accordingly. The hollow perforated diffuser tube of said copending application, as well as the diffuser tube of the present invention, perform the desired function of diffusing and distributing the pulse or blast of cleaning air over the entire filter bag to thus provide much more effective and efficient cleaning of the filter bag.

In order to lend rigidity and stability to the air diffuser tube while substantially eliminating the "blank-out" problem presented by the longitudinal seams of the convolute air diffuser tubes used heretofore, the hollow air diffuser tubes used heretofore, the hollow air diffuser tube 30 of the present invention is formed from a perforated strip of helically wound sheet metal, a portion of such strip being indicated at 34 in FIG. 3 in its condition prior to having been formed into the air diffuser tube 30 for the purposes of illustrating that the strip 34 is provided with marginal imperforate areas or edges portions 34a along its opposite longitudinal side edges. The remaining major portion of the width of the strip 34 is perforated with relatively small perforations 35 therein arranged in transverse rows in relatively closely spaced relationship and with the perforations 35 in alternate transverse rows being arranged in staggered relation to the perforations 35 in the intervening rows between such alternate rows to permit the rows of perforations to be located relatively close together without unduly weakening the diffuser tube. Although the size of the perforations is not critical, holes or perforations 35 of about one-eighth inch (3.175 mm) diameter may be provided, for example, in strip 34. In this regard, by way of example, a sheet metal strip 34 of about a six inch (152.4 mm) width such as that shown in FIG. 3, and from which a typical three and one-half inch (88.9 mm) diameter air diffuser tube 30 was made, had one-eighth inch (3.175 mm) diameter perforations 35 therein arranged in transverse rows whose centers were spaced about three-sixteenths of an inch (4.762 mm) apart, and the center-to-center distance between each adjacent pair of perforations 35 in each transverse row also was about three-sixteenths of an inch (4.762 mm).

Referring now to FIGS. 4, 5 and 6, it can be seen that adjacent edges of the strip 34 are interconnected by a seam broadly designated at 36 and in which seam adjacent edges of the strip 34 overlap each other in interlocking relationship, with the seam 36 thus extending helically around the air diffuser tube from one end thereof to the other. As best shown in FIGS. 5 and 6, it can be observed that the seam 36 is formed of the adjacent imperforate area portions 34a of the strip 34, with such portions being folded upon themselves and being positioned in interlocking relationship. However, it is to be noted that the inner surface of the air diffuser tube 30 is substantially smooth throughout the length of the tube with the helically extending interlocking portions of the strip forming the seam 36 thereof projecting outwardly of, but not inwardly of the diffuser tube, to provide a thickened area to impart rigidity to the air diffuser tube 30 and thereby lend strength against collapsing of the tube 30.

To further enhance the strength of the improved air diffuser tube 30, it is desirable that the width of the perforated strip 34, as viewed in FIG. 3, is such that the lead of the helix or pitch defined by the helical seam 36 is no more than about twice the diamter of the tube 30 so as to impart substantial compressive resistance strength to the tube. Further, the minimum width of the strip 34 and the lead of the helix defined by the seam 36 should be sufficient so that adjacent turns of the seam 36 are not positioned in such close relationship as to unduly impede the flow of air through the tube wall. A typical air diffuser tube 30 formed in accordance with the present invention was about three and one-half inches (88.9 mm) in diameter formed from a metal peforated strip 34 about six inches (152.4 mm) wide, with the seam 36 being about five-sixteenths inch (7.938 mm) wide and the lead of the helix being about five and one-half inches (139.7 mm).

It is apparent that those portions or areas 34a of adjacent edges of the strip 34 defining the seam are substantially or entirely imperforate throughout the seam 36, thus further enhancing the strength imparted to the air diffuser tube 30 by the helical seam 36. It can be appreciated that the perforations 35 in the strip 34 are relatively small and are distributed generally uniformly throughout the length of and a major portion of the width of the strip 34, but excluding those portions of adjacent edges of the strip 34 forming the seam 36.

Since the perforations 35 are formed in tranverse rows in the strip 34, as in FIG. 3, prior to the strip 34 being formed into the spiral or helical tube 30, it can be appreciated, by referring to FIG. 4, that the perforations are arranged in rows which extend diagonally to the longitudinal axis of the air diffuser tube 30.

It has been determined that helically wound sheet metal air diffuser tubes of the present invention have improved characteristics of rigidity and stability even when made from relatively lightweight sheet metal as compared to the heavier weight of the sheet metal of which convolute wound diffuser tubes have been made heretofore in order to obtain the desired rigidity and stability thereof.

For example, heretofore a typical convolute wound three and one-half inch (88.9 mm) diameter air diffuser tube was formed from 24 gauge stainless steel sheet metal having a thickness of about 0.0235 inch (0.597 mm) and weighing about 0.978 pound per square foot (4.77 Kg/m$^2$). The same size air diffuser tube made in accordance with this invention to form a helically wound diffuser tube was formed from relatively lightweight 28 gauge stainless steel metal, i.e., approximately 0.015 inch (0.381 mm) thick and weighing approximately 0.630 pound per square foot (3.07 Kg/m$^2$). Thus, it can be appreciated that the helically wound sheet metal air diffuser tube was formed of metal of about one third less thickness and weight as compared to the same size convolute air diffuser tubes, but at the same time readily exhibited enhanced rigidity and stability over such convolute tubes. This improved rigidity of these helically wound tubes was readily evident visually by handling the tubes and attempting to manually squeeze, depress or distort the same so as to form indentations therein. Considerable resistance in the helically wound tube to such pressures were present, indeed, strikingly so, as compared to the heavier weight, greater thickness metal tubes of convolute construction. For example, the convolute tube appeared to present very little resistance to caving in from relatively mild squeezing pressure by one's hands. On the other hand, the helically wound tube could only be distorted or caved in upon manual pressures being exerted thereon considerably above the forces that readily caved in the convolute tube.

Thus, it can be appreciated that the helically wound sheet metal air diffuser tube of the present invention is of improved construction even though formed of lighter weight metal such lighter weight metal therefore substantially reducing the cost of manufacture and facilitating the handling, shipping and installing of the tubes, particularly as compared to the heavier convolute air diffuser tubes used heretofore.

In the drawings and specification there has been set forth a preferred embodiment of the invention and although specific terms are employed, they are used in a generic and descriptive sense and not for purposes of limitation, the scope of the invention being defined in the claims.

That which is claimed is:

1. In a filter apparatus of the type wherein a particulate-laden gas is directed through a tubular filter bag for filtering and retaining the particulate material on the exterior of the bag, and wherein the filter bag is cleaned by a periodic reverse purge of air into the bag, said filter bag having an outlet end for discharge of the filtered gas and being supported by a tubular supporting cage positioned within said filter bag, the combination therewith of a hollow air diffuser tube formed from a perforated strip of helically wound sheet metal and extending longitudinally within said tubular supporting cage, and wherein adjacent edges of said strip are interconnected by a seam in which said adjacent edges overlap each other in interlocking relationship and with said seam thus extending helically around said air diffuser tube, and said tube being in communication with said outlet end of said filter bag for receiving a reverse purge of air therein for diffusing and distributing the air throughout said filter bag when a periodic reverse purge of air is directed into the outlet end of the filter bag so as to more effectively clean the filter bag while also reducing excessive flexing of the filter bag and abrasive wear thereof to thereby provide a substantial increase in the efficiency of the filter apparatus and a significant increase in the life of the filter bag.

2. A filter apparatus according to claim 1 wherein those portions of adjacent edges of said strip defining said seam are substantially imperforate throughout said seam.

3. A filter apparatus according to claim 1 wherein the perforations in said strip are relatively small and are distributed generally uniformly through the length and a major portion of the width of said strip but excluding those portions of adjacent edges of said strip forming said seam.

4. A filter apparatus according to claim 1 wherein said perforations are arranged in rows extending diagonally to the longitudinal axis of said air diffuser tube.

5. A filter apparatus according to claim 4 wherein the perforations in said strip are relatively small and arranged in rows with the perforations in alternate rows being staggered relative to the perforations in intervening rows to permit the rows of perforations to be located relatively close together without unduly weakening the diffuser tube, and wherein the rows of perforations extend diagonally relative to the longitudinal axis of said diffuser tube.

6. A filter apparatus according to any one of claims 1-5 in which the sheet metal of said strip is about 0.015 inch (0.381 mm) thick, and the lead of the helix defined by said seam is no more than about twice the diameter of said air diffuser tube.

7. A filter apparatus according to any one of claims 1-5 wherein said air diffuser tube is mounted in inwardly spaced relation from said tubular cage substantially throughout its length so as to be positioned substantially out of contact with said tubular filter bag.

8. A filter apparatus according to any one of claims 1-5 wherein said air diffuser tube is substantially smooth interiorly throughout its length, and wherein said helically extending seam includes interlocked portions of said perforated strip projecting outwardly of but not inwardly of said diffuser tube and lending strength against collapsing of said tube.

9. In a filter apparatus of the type having a filtering chamber containing a plurality of tubular filter bags, wherein a particulate-laden gas is directed into the filtering chamber and through the respective tubular filter bags for filtering and retaining the particulate material on the exterior of the bags, and wherein the filter bags are cleaned by a periodic reverse purge of air into the bags, and wherein each filter bag has an outlet end for discharge of the filtered gas and is supported by a tubular supporting cage positioned within said filter bag, the combination therewith of a hollow air diffuser tube formed from a strip of helically wound sheet metal and extending longitudinally within each of said tubular supporting cages, adjacent edges of the sheet metal strip of each said diffuser tube being interconnected by a seam in which said adjacent edges overlap each other in interlocking relationship with such seam thus extending helically around the respective air diffuser tube, and each of said diffuser tubes having one end thereof communicating with said outlet end of the filter bag and having perforations therein located for diffusing and distributing air throughout the filter bag when a reverse purge of air is directed into the outlet end of the filter bag and into the diffuser tube so as to more effectively clean the filter bag while also reducing excessive flexing of the filter bag and abrasive wear thereof to thereby provide a substantial increase in the efficiency of the filter apparatus and a significant increase in the life of the filter bag.

10. A filter apparatus according to claim 9 wherein each of said diffuser tubes is substantially smooth interiorly throughout the length thereof, and wherein said helically extending seam of each tube includes interlocked portions of the respective strip projecting outwardly of but not inwardly of the respective diffuser tube and lending strength against collapsing of each respective tube.

* * * * *

UNITED STATES PATENT AND TRADEMARK OFFICE
CERTIFICATE OF CORRECTION

PATENT NO. : 4,297,115

DATED : October 27, 1981

INVENTOR(S) : Allen S. Johnson, Jr.

It is certified that error appears in the above—identified patent and that said Letters Patent are hereby corrected as shown below:

Column 2, line 51, after "improved" insert --hollow--.

Column 2, line 57, "filer" should be --filter--.

Column 2, line 58, after "as" insert --a--.

Column 3, line 8, "in" should be --is--.

Column 4, line 2, after "diffuser" insert --tube--.

Column 4, line 16, after "have" insert --a--.

Column 4, lines 47 and 48, delete "the hollow air diffuser tubes used heretofore".

Column 4, line 53, "purposes" should be --purpose--.

Column 8, Claim 9, line 17, "said" should be --air--.

Signed and Sealed this

Twelfth Day of January 1982

[SEAL]

Attest:

GERALD J. MOSSINGHOFF

*Attesting Officer*   *Commissioner of Patents and Trademarks*